United States Patent
Dehn et al.

(10) Patent No.: US 7,927,449 B2
(45) Date of Patent: Apr. 19, 2011

(54) SANDWICHED ARTICLE FOR ENHANCEMENT OF A VEHICLE

(75) Inventors: Dennis L. Dehn, Dallas, TX (US); Tadao Kodate, Saitama (JP)

(73) Assignee: Eclipse Investment, Ltd., Dallas, TX (US)

( * ) Notice: Subject to any disclaimer, the term of this patent is extended or adjusted under 35 U.S.C. 154(b) by 1239 days.

(21) Appl. No.: 11/093,005

(22) Filed: Mar. 29, 2005

(65) Prior Publication Data
US 2006/0226626 A1    Oct. 12, 2006

(51) Int. Cl.
*B29C 65/00* (2006.01)

(52) U.S. Cl. ............ 156/285; 156/286; 264/36.15; 264/36.22; 264/510; 264/511; 264/552; 264/553; 264/571; 150/157

(58) Field of Classification Search .......... 156/285, 156/181, 213, 221, 22, 246, 245, 278, 94, 156/286; 264/264, 265, 36.15, 36.22, 510, 264/511, 552, 553, 571; 428/42.1; 150/167
See application file for complete search history.

(56) References Cited

U.S. PATENT DOCUMENTS

| | | | | |
|---|---|---|---|---|
| 3,682,768 A | * | 8/1972 | Adams et al. | 428/519 |
| 4,824,631 A | * | 4/1989 | Yeager | 264/552 |
| 5,876,546 A | * | 3/1999 | Cloud | 156/212 |
| 5,884,380 A | * | 3/1999 | Thurm | 29/401.1 |
| 2004/0146714 A1 | | 7/2004 | McCollum et al. | |
| 2005/0247501 A1 | * | 11/2005 | Baker | 180/219 |
| 2005/0281999 A1 | * | 12/2005 | Hofmann et al. | 428/304.4 |
| 2006/0191624 A1 | * | 8/2006 | Whitworth et al. | 156/94 |

FOREIGN PATENT DOCUMENTS

| | | |
|---|---|---|
| JP | 2003011797 | 1/2003 |
| JP | 2003237640 | 8/2003 |

OTHER PUBLICATIONS

Joybond Brochure, with English translation, date unknown (12 pages).
Joybond Brochure, "Customizing and Repair Using Joybond", with English translation, date unknown (15 pages).
Adam Till, "Towing Large Scale Sailplanes with Electric Tugs—Part 1", Lift Zone, RCGroups.com Network > Lift Zone > Article Archive > Miscellaneous, Dec. 22, 2003 (12 pages).

(Continued)

*Primary Examiner* — Richard Crispino
*Assistant Examiner* — Christopher Schatz
(74) *Attorney, Agent, or Firm* — Meyertons, Hood, Kivlin, Kowert & Goetzel, P.C.; Eric B. Meyertons

(57) ABSTRACT

A cured sandwiched article may be used to enhance a portion of a vehicle. In some embodiments, a cured sandwiched article may include a core sandwiched between one or more backing layers and one or more top layers cured to conform to a surface of a vehicle. A cured sandwiched article may be made by steps including shaping a core, positioning the core between one or more backing layers and one or more top layers to form the sandwiched article, and curing the sandwiched article. A cured sandwiched article may be connected to a surface of a vehicle by providing adhesive to a bottom surface of the cured sandwiched article, positioning the cured sandwiched article on a surface of the vehicle, and curing the adhesive. In some embodiments, the cured sandwiched article may include a plurality of fiber-optic fibers.

22 Claims, 9 Drawing Sheets

OTHER PUBLICATIONS http://www.3dflames.com, date unknown (9 pages).
http://www.surfnpt.com/pages/1/index.htm, date unknown (5 pages).

"Foam Core Processing" accessed from http://boatdesign.net/articles/foam-core/ with an upload date of Apr. 6, 2002.

* cited by examiner

SANDWICHED ARTICLE FOR ENHANCEMENT OF A VEHICLE

BACKGROUND

1. Field of Invention

The present invention generally relates to a cured sandwiched article for enhancement of a vehicle. Embodiments of the invention relate to three-dimensional decorative articles for enhancement of a surface of a portion of a vehicle.

2. Description of Related Art

Decorative designs are popular enhancements for vehicles, including motorcycles, automobiles, trucks, recreational vehicles, and boats. Adding a decorative design to an object may include painting (e.g., airbrushing) a custom design on the object or applying a decal to the object. In some cases, three-dimensional decorative designs are applied to objects to alter surface contours of the objects. Methods of forming and applying three-dimensional designs to objects provide a range of visual appeal of the enhancements.

SUMMARY

In some embodiments, a motorcycle gasoline tank may include a surface enhanced by a cured sandwiched article. The cured sandwiched article may include a core sandwiched between one or more backing layers and one or more top layers. The one or more backing layers and the one or more top layers may include a first curable substance and a second curable substance, respectively. In some embodiments, the sandwiched article may be cured proximate a mold under at least a partial vacuum to substantially conform to the surface of the gasoline tank.

In some embodiments, a method of making a cured sandwiched article for enhancement of a surface a portion of a vehicle may include placing one or more backing layers on a first surface. A first curable substance may be provided to at least one of the backing layers. A core may be provided on at least one of the backing layers. One or more top layers may be provided on the core. A second curable substance may be provided to at least one of the top layers. In some embodiments, at least one of the backing layers, or at least one of the top layers, may be substantially conformed to the core to form the sandwiched article. The sandwiched article may be positioned on the surface of the portion of the vehicle. In certain embodiments, one or more permeable layers may be provided to the sandwiched article. At least a partial vacuum may be applied to the sandwiched article. At least a portion of the first curable substance and at least a portion of the second curable substance may be cured under the partial vacuum to at least partially cure the sandwiched article. Making the cured sandwiched article may further include removing the cured sandwiched article from the portion of the vehicle. The one or more permeable layers may be removed from the cured sandwiched article. In some embodiments, the cured sandwiched article may be shaped to be connected to the surface of the portion of the vehicle or a substantially similar surface.

In some embodiments, a cured sandwiched article for enhancement of a surface of a portion of a vehicle may include a core. In some embodiments, the core may be sandwiched between one or more backing layers including a first curable substance and one or more top layers including a second curable substance. In certain embodiments, the sandwiched article may have been cured proximate a mold under at least partial vacuum to substantially conform to the surface of the portion of the vehicle and removed from the mold after at least partial curing.

In some embodiments, a cured sandwiched article may be cured such that at least a portion of the bottom surface of the cured sandwiched article substantially conforms to a surface of a portion of the vehicle. A method of connecting a cured sandwiched article to a portion of a vehicle may include providing adhesive to a bottom surface of the cured sandwiched article. In certain embodiments, a cured sandwiched article with adhesive on a bottom surface may be positioned on a surface of the portion of the vehicle. The adhesive may be cured to connect the cured sandwiched article to the surface of the portion of the vehicle.

In some embodiments, a cured sandwiched article for enhancement of a surface of a portion of a vehicle may include a core sandwiched between one or more backing layers and two or more top layers. The one or more backing layers and the one or more top layers may include a first curable substance and a second curable substance, respectively. In some embodiments, a plurality of fiber-optic fibers may be positioned between at least two of the top layers. In certain embodiments, the sandwiched article may be cured proximate a mold under at least a partial vacuum to substantially conform to the surface of the portion of the vehicle. The cured sandwiched article may be removed from the mold after at least partial curing.

BRIEF DESCRIPTION OF THE DRAWINGS

Advantages of the present invention will become apparent to those skilled in the art with the benefit of the following detailed description and upon reference to the accompanying drawings in which.

Figure 1A:
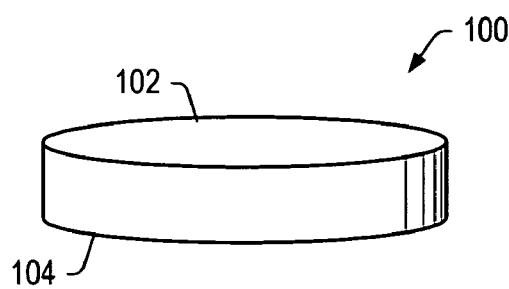
FIGS. 1A and 1B depict perspective views of embodiments of a sandwiched article with a substantially flat bottom surface.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

Three-dimensional articles may be used to enhance the appearance, structure, and/or function of vehicles including, but not limited to, recreational vehicles, motorcycles, automobiles, trucks, boats, and airplanes. In some embodiments, the three-dimensional article may be a decorative article. The three-dimensional article may be a sandwiched article (e.g., a cured sandwiched article). In certain embodiments, a sandwiched article may include a core positioned between two or more outer layers. A sandwiched article may be cured and then connected (e.g., adhered) to a vehicle or to a portion of a vehicle (e.g., a surface of a vehicle or a surface of a portion of a vehicle) and finished as desired. Adhering a sandwiched article to a surface of a vehicle may include providing an adhesive or other substance to a portion (e.g., a back layer) of the sandwiched article. As used herein, "substance" may generally refer to material from which something is made or which has discrete existence. For example, a substance may be a composition that may be spread on a surface or a piece of a material that can be placed on a surface. As used herein, "providing" generally means to supply or make available to (e.g., to supply adhesive to a sandwiched article with any application process, method, or tools known in the art). A cured sandwiched article connected to a vehicle may appear as a seamless, raised contour on the vehicle.

Figure 1B:
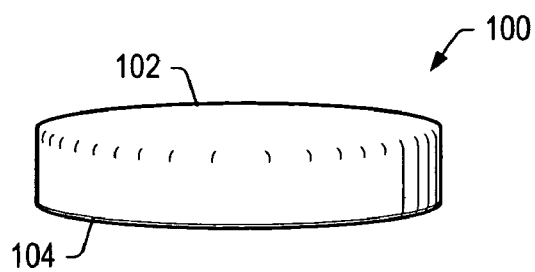
Figure 2:
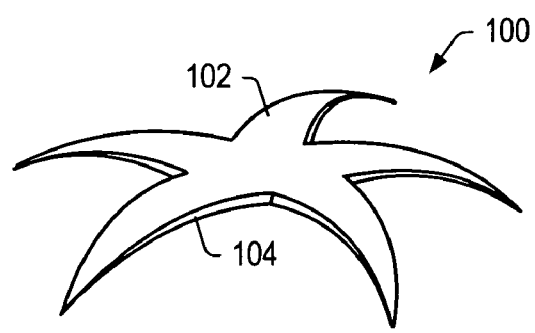
FIG. 2 depicts a perspective view of an embodiment of a sandwiched article with a contoured bottom surface.

FIG. 1A depicts a perspective view of an embodiment of sandwiched article 100 that may be used for enhancement of a vehicle. Sandwiched article 100 may be a regular or irregular article of constant or varying thickness. Sandwiched article 100 may have tapered edges to allow for a seamless look following adhesion of the sandwiched article to a vehicle. In some embodiments, as depicted in FIG. 1B, top surface 102 of sandwiched article 100 is contoured while bottom surface 104 is substantially flat. In certain embodiments, top surface 102 and bottom surface 104 of sandwiched article 100 are both contoured. For example, top surface 102 may be contoured to achieve a desired visual or structural effect, while bottom surface 104 is contoured to conform to a portion of the vehicle to which sandwiched article 100 is to be connected. FIG. 2 depicts a perspective view of an embodiment of sandwiched article 100 with contoured top surface 102 and contoured bottom surface 104.

Figure 3:
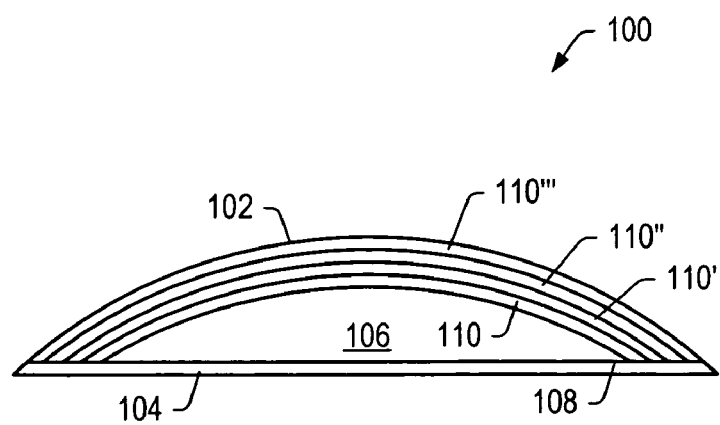
FIG. 3 depicts a cross-sectional view of an embodiment of a sandwiched article.

FIG. 3 depicts a cross-sectional view of an embodiment of sandwiched article 100. Sandwiched article 100 may include core 106 between one or more backing layers 108 and one or more top layers 110. Core 106 may include one or more pieces of one or more materials, such as rubber, wood, plastic, clay (e.g., curable clay), polymer foams (e.g., polyurethane foam), etc. In some embodiments, core 106 may be substantially rigid (e.g., inflexible). In certain embodiments, at least a portion of core 106 may be somewhat flexible or malleable.

In some embodiments, backing layers 108 and top layers 110 may be woven or nonwoven, flexible, and/or permeable. Backing layers 108 and top layers 110 may include fiberglass and/or natural and/or synthetic fibers. For example, backing layers 108 and top layers 110 may include fiberglass mats, chopped fiberglass strand mats, random layers of fiberglass, fiberglass fabric, cut glass fibers, ground glass fibers, mineral fibers, natural fiber mats, natural knitted fabrics, cut natural fibers, cut natural fiber mats, non-woven fabrics based on polymer, carbon or aramid fibers, and knitted fabrics based on polymer, carbon or aramid fibers. Backing layers 108 and top layers 110 of the sandwiched article may be the same or different. In some embodiments, backing layers 108 and top layers 110 may be different weights and/or thicknesses of a similar composition and/or construction. In certain embodiments, fiber-optic fibers or strands may be provided on the outermost top layer and/or between two layers (e.g., positioned or sandwiched between two top layers or underneath a final clear coat) to enhance a sandwiched article with lighting effects.

As depicted in FIG. 3, sandwiched article 100 may include one backing layer 108. Backing layer 108 may be made of, for example, fiberglass (e.g., a heavy fiberglass sheet or mat) or KEVLAR® (e.g., woven KEVLAR® fabric). A relatively heavy backing layer 108 (or combination of backing layers) may provide structural support for sandwiched article 100. In some embodiments, a relatively heavy backing layer may include fiberglass fabric with a weight of at least 4 ounces per square yard (e.g., 4, 10, or 38 ounces per square yard). In certain embodiments, a texture and/or composition of backing layer 108 may be chosen to enhance adhesion of sandwiched article 100 to a surface of a vehicle.

In some embodiments, sandwiched article 100 may include one or more (e.g., two, three, four, or more) top layers. In certain embodiments, top layers 110, 110', and 110" may be of substantially the same composition, construction, and/or weight. For example, top layers 110, 110', and 110" may be woven fiberglass fabric of substantially the same mesh. In some embodiments, top layer 110'" may be a different composition and/or weight than one or more of top layers 110, 110', and 110". For example, top layer 110'" may be a finer mesh woven fiberglass material than any of top layers 110, 110', and 110". In certain embodiments, sandwiched article 100 may include two or more top layers 110 of successively finer mesh woven fiberglass material. Having finer mesh top layers 110 may advantageously allow for a smoother finish of top surface 102 of sandwiched article 100. In some embodiments, a texture of top layer 110 may be chosen to impart a desired texture to top surface 102 of sandwiched article 100.

Backing layers 108 and top layers 110 may be adhered to each other and/or to core 106 with one or more curable substances. The curable substance may include, but is not limited to, polyurethane resin, acrylic, methacrylics, polyesters, etc. The curable substance may be cured in any manner generally known in the art including curing with, but not limited to, heat, light, and/or other forms of electromagnetic radiation.

In some embodiments, a sandwiched article may be formed and then cured to conform to a portion of a vehicle and later adhered to the same portion of the vehicle. In certain embodiments, a sandwiched article may be formed and then cured to conform to a portion of a vehicle and then later adhered to a substantially similar portion of another vehicle. In other embodiments, a sandwiched article may be formed, cured to conform to a model of a portion of a vehicle, and then later adhered to a vehicle with a contour substantially similar to the model to which the sandwiched article was conformed.

In some embodiments, a sandwiched article may be a custom (e.g., one of a kind) design. A custom design may be constructed and cured to conform as desired to a selected portion of a vehicle. A custom design may include decorative features as chosen by a purchaser of the design. In some embodiments, a sandwiched article may include a company name, logo, emblem, or design chosen for advertising purposes. In certain embodiments, a sandwiched article may be a standard design that is made to fit a commercially available product. For example, a quantity of substantially similar sandwiched articles may be produced for enhancement of a portion of a widely available motor vehicle, such as a gasoline tank for a motorcycle of a popular make and/or model. Enhancing a motorcycle gasoline tank with a sandwiched design may advantageously allow the gasoline tank to be embellished nondestructively (e.g., providing an ornamental exterior without heating, impacting, denting, or otherwise deforming the gasoline tank) such that properties such as shape and/or strength of the gasoline tank are not altered.

Figure 4:
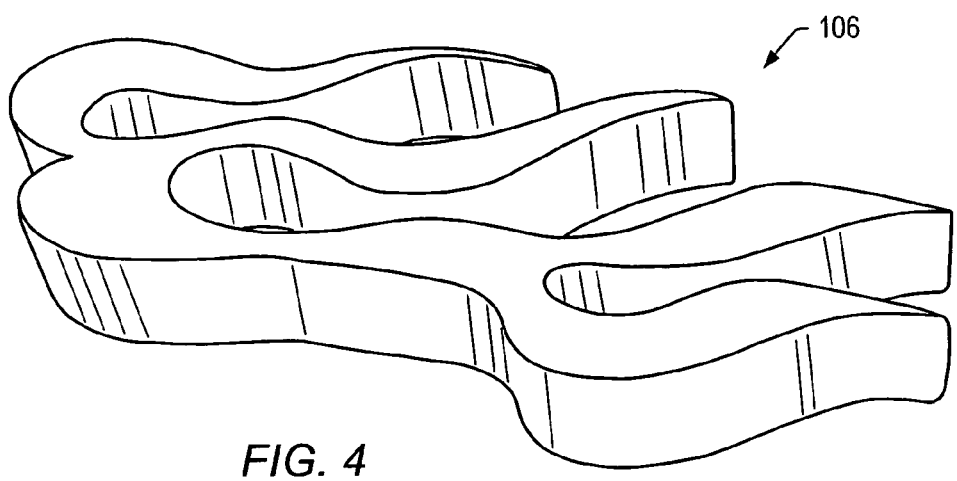
FIG. 4 depicts a perspective view of an embodiment of a core cut from a piece of core material.

For custom and/or commercially available sandwiched articles, cores may be shaped as desired by methods including, but not limited to, molding, cutting, sculpting, and/or combinations thereof. A desired shape may include, but is not limited to, a regular or irregular shape of constant or varying thickness. In some embodiments, a desired shape may be a pattern that is drawn or printed on paper or other surface or transferred to a piece of core material. The core material may be of any dimension (e.g., size, shape, thickness) required for a desired three-dimensional article. In certain embodiments, core material may be cut into a desired shape by methods known in the art, including manually or mechanically forcing a hot wire through the core material to cut the core material in the desired shape. FIG. 4 depicts a perspective view of an embodiment of core 106 that has been cut from a piece of core material.

Figure 5:
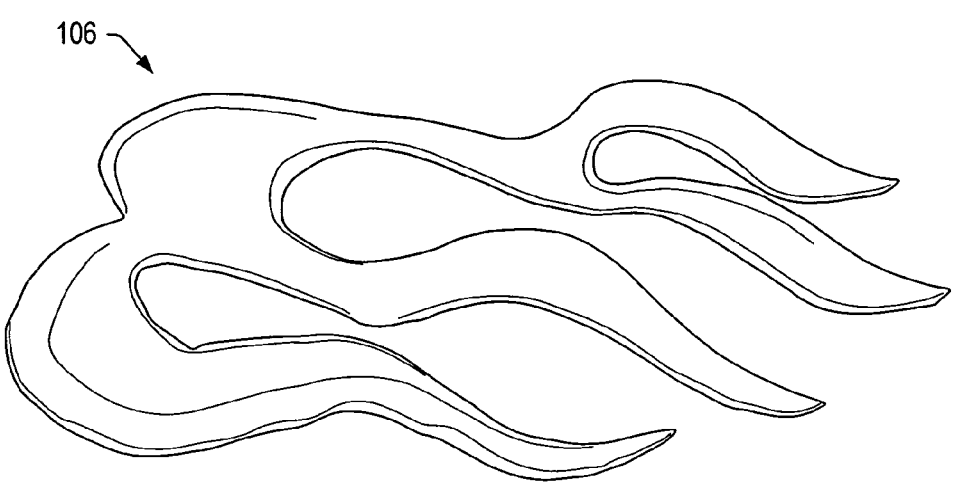
FIG. 5 depicts a perspective view of the embodiment of the core in FIG. 4 after the core has been finished.

In some embodiments, a cut or formed core may be finished by methods including, but not limited to, trimming, sculpting, sanding, and/or combinations thereof. Finishing a core may include detailing such as, for example, rounding edges, smoothing corners, tapering sides, and forming grooves and/or ridges. In certain embodiments, a top and/or sides of a core may be finished, while a bottom of the article may be left substantially unchanged. For example, if the core is cut from a rectangular solid, the bottom of the core may be left substantially flat. FIG. 5 depicts core 106 from FIG. 4 after finishing (e.g., contouring) of the top and sides of the core.

Before and/or after a core has been formed and/or finished, at least a portion of the core may be altered to allow for bending of the core. Bending of the core may advantageously allow the core to be conformed to a contour of the object (or a substantially similar object) to which the core is to be adhered. In some embodiments, altering the core may include, for example, cutting and/or notching a portion of the core (e.g., cutting partially through the core from a first side toward a second side) with any cutting means known in the art. Cutting of a portion of the core may assume a regular pattern or may include one or more irregular cuts. Cutting of a portion of the core may include making cuts of fixed or variable length to a fixed or variable depth.

Figure 6:
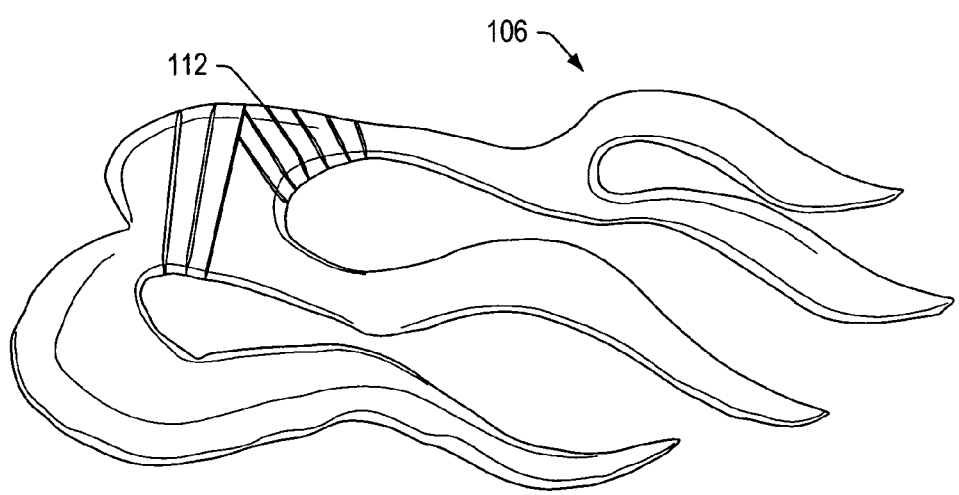
FIG. 6 depicts a perspective view of the embodiment of the core in FIG. 5 after a top surface of the core has been cut to allow bending of the core.

One or more sides of a core may be altered to allow for bending of the core. For example, a top surface and/or a bottom surface of a core may be altered to allow for bending of the core. Altering a top surface of a core (e.g., cutting partially through the core from the top toward the bottom) may allow at least a portion of the core to be bent to conform to a convex contour of a portion of a vehicle. Altering a bottom surface of a core (e.g., cutting partially through the core from the bottom toward the top) may allow at least a portion of the core to be bent to conform to a concave contour of a portion of a vehicle. In some embodiments, a top surface and a bottom surface of a core may be altered to allow the core to conform to convex and concave contours of a portion of a vehicle. In some embodiments, one or more side portions of a core may be altered to allow for lateral bending of the core. FIG. 6 depicts core 106 of FIG. 5 with cuts 112 on top of the core to allow the core to be conformed to a convex contour of a portion of a vehicle.

After a core has been formed as desired, the core may be sandwiched between two or more layers to form a sandwiched article. In some embodiments, the sandwiched article may include a backing layer and one or more top layers. In certain embodiments, the sandwiched article may include two or more backing layers and two or more top layers. For example, a sandwiched article may include a backing layer and two to four top layers.

In some embodiments, a sandwiched article may be formed on an anti-stick surface. As used herein, "anti-stick" generally means any surface chosen to inhibit sticking of portions of the sandwiched article (e.g., a backing layer, a top layer that overlaps the backing layer) to the surface while the sandwiched article is being formed. An anti-stick surface may include, but is not limited to, a layer of plastic or a perhalogenated (e.g., perfluorinated) surface or layer. In certain embodiments, an anti-stick surface may act as an impermeable barrier between the sandwiched article and the work surface below the sandwiched article.

A backing layer may be placed on the anti-stick surface. Dimensions of a backing layer may be chosen to be larger than dimensions of the bottom surface of the core. That is, the backing layer may be chosen (e.g., cut) such that the core, when placed on the backing layer, does not contact the anti-stick surface. In some embodiments, a shape of a backing layer may be chosen to be similar to a shape of the core. After the backing layer has been placed on the anti-stick surface, a curable substance may be provided to the backing layer. The curable substance may be mixed before application. Providing the curable substance to the backing layer may include providing (e.g., applying by painting or coating) an excess amount of the curable substance on the backing layer. Applying an excess amount of the curable substance may include applying the curable substance until the backing layer no longer absorbs the curable substance or until the backing layer is saturated with the curable substance. In some embodiments, one or more additional backing layers may be placed on top of the first backing layer. In certain embodiments, a curable substance may be provided to one or more of the additional backing layers.

Figure 7:
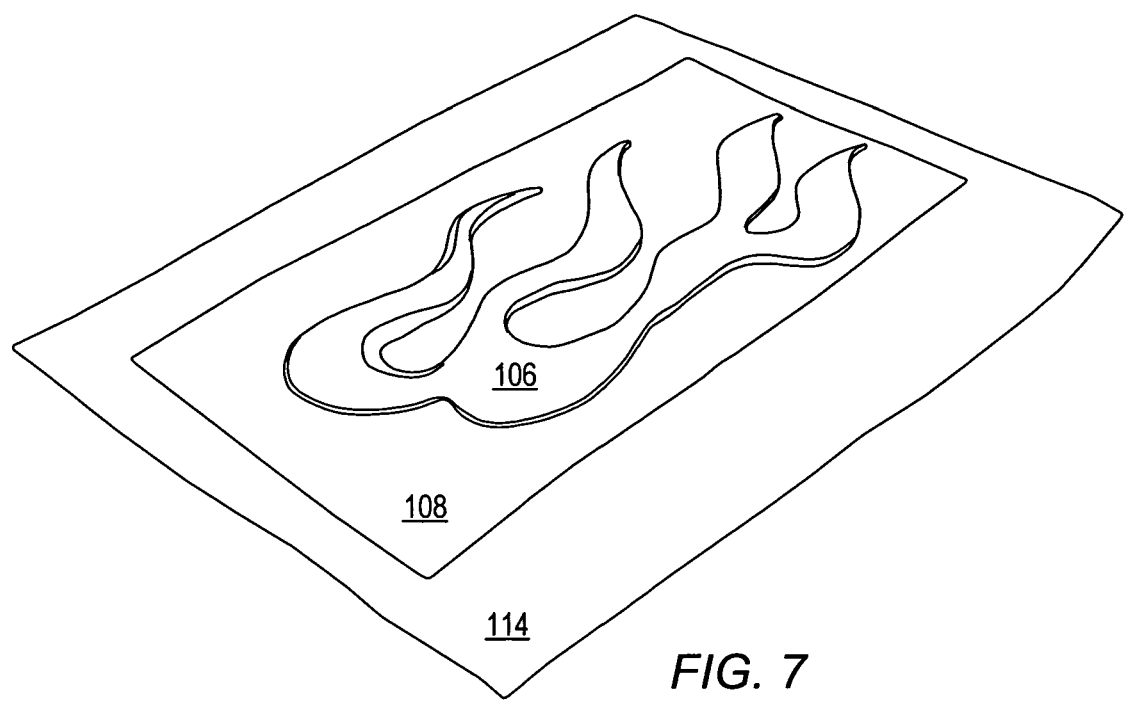
FIG. 7 depicts an embodiment of a core positioned on a backing layer.

A core may be placed on the backing layer. FIG. 7 depicts an embodiment of core 106 on backing layer 108. Backing layer 108 is shown on top of anti-stick surface 114. In some embodiments, pressure may be applied manually or mechanically to core 106 to increase contact between backing layer 108 and the core. Increasing contact between backing layer 108 and core 106 may allow the backing layer to substantially conform to the bottom surface of the core. Applying pressure to core 106 may reduce a number and/or size of air pockets between the core and backing layer 108.

Figure 8:
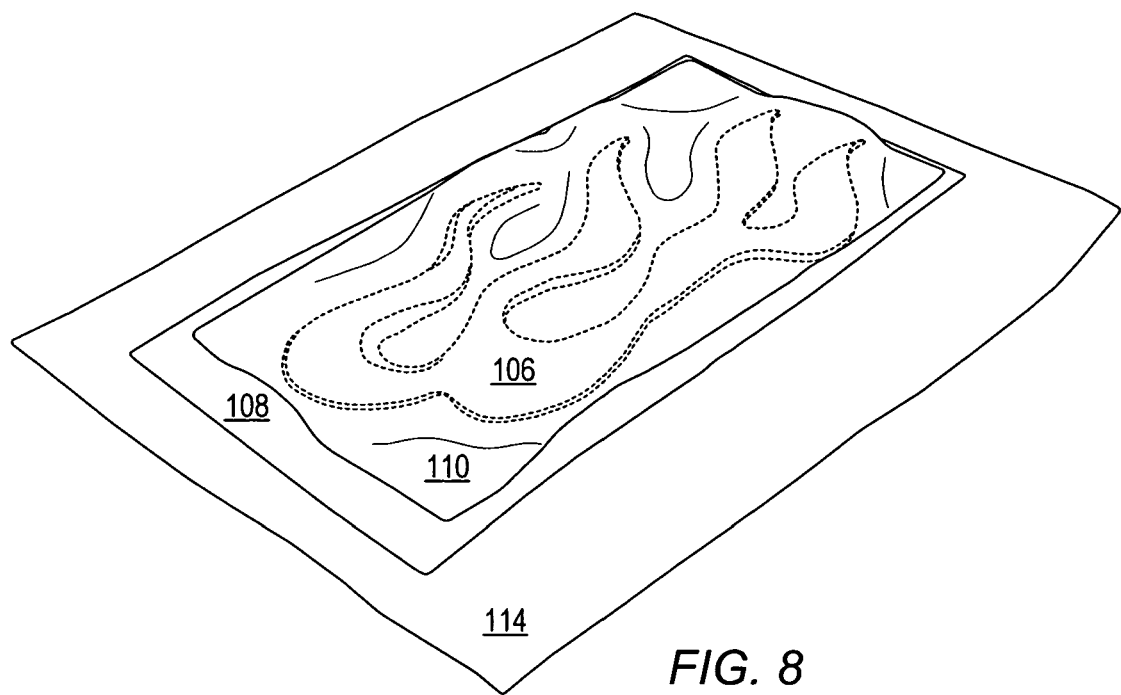
FIG. 8 depicts an embodiment of a first top layer positioned on the top surface of the core shown in FIG. 7.
Figure 9:
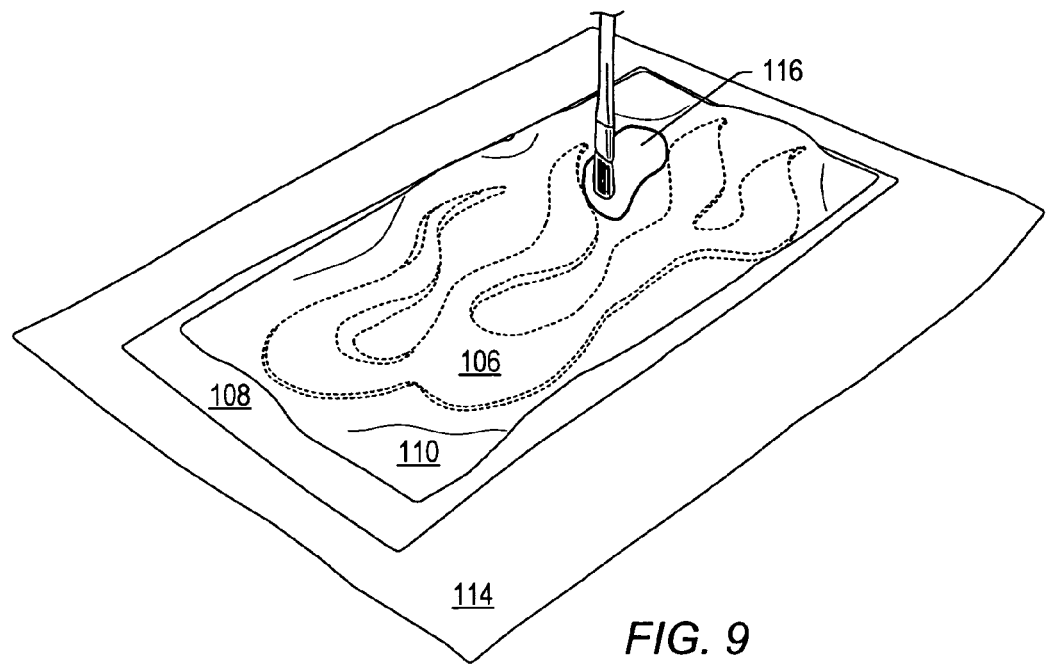
FIG. 9 depicts an embodiment of a step of providing curable substance to the first top layer depicted in FIG. 8.

With core 106 on backing layer 108, top layer 110 may be positioned on the top surface of the core. FIG. 8 depicts an embodiment of top layer 110 on the top surface of core 106 shown in FIG. 7. In some embodiments, top layer 110 may include a woven fiberglass material with a weight of, for example, 4 ounces or less per square yard. As depicted in FIG. 9, curable substance 116 may be provided to top layer 110. Top layer 110 may be conformed (e.g., manually or mechanically) to the top surface and/or the sides of core 106 to promote contact of the core and the first top layer. Conforming top layer 110 to the top surface of core 106 may reduce a number and/or size of air pockets between the core and the first top layer. In some embodiments, conforming top layer 110 to the core may include pressing portions of the top layer that extend beyond the core onto portions of backing layer 108 that extend beyond the bottom surface of the core, thus enclosing (e.g., sealing) the core between the backing layer and the top layer.

After a first top layer has been positioned on the core, one or more additional top layers may be similarly positioned on the first top layer. In some embodiments, one or more additional top layers may include two to four (e.g., three) additional top layers. A curable substance may be applied to one or more of the additional top layers, and one or more of the additional top layers may be conformed to the core and the backing layer and/or other top layers to form a sandwiched article. In some embodiments, the first top layer and the one or more additional top layers may be of the same composition, construction, and/or weight. In certain embodiments, the first top layer and the one or more additional top layers may be of different composition, construction, and/or weight. For example, the first top layer and the one or more additional top layers may include materials such as, but not limited to, fiberglass, carbon fiber, biaxial composites, DYNEL™ fibers, etc. In some embodiments, one of the additional top layers may be a finer mesh and/or lighter weight than the first top layer. For example, the first top layer may be a woven fiberglass mesh with a weight of 4 ounces per square yard. The final top layer may be a woven fiberglass mesh with a weight of, for example, 2 ounces or 1.4 ounces per square yard. A finer fiberglass mesh may advantageously result in a finer, smoother top surface of the finished sandwiched article. In certain embodiments, for example, two additional top layers substantially the same as the first top layer may be placed on the first top layer. A third additional layer of a finer mesh may be placed on top of the second additional layer. In some embodiments, each successive additional top layer may be a finer mesh and/or lighter weight than the first top layer.

Figure 10:
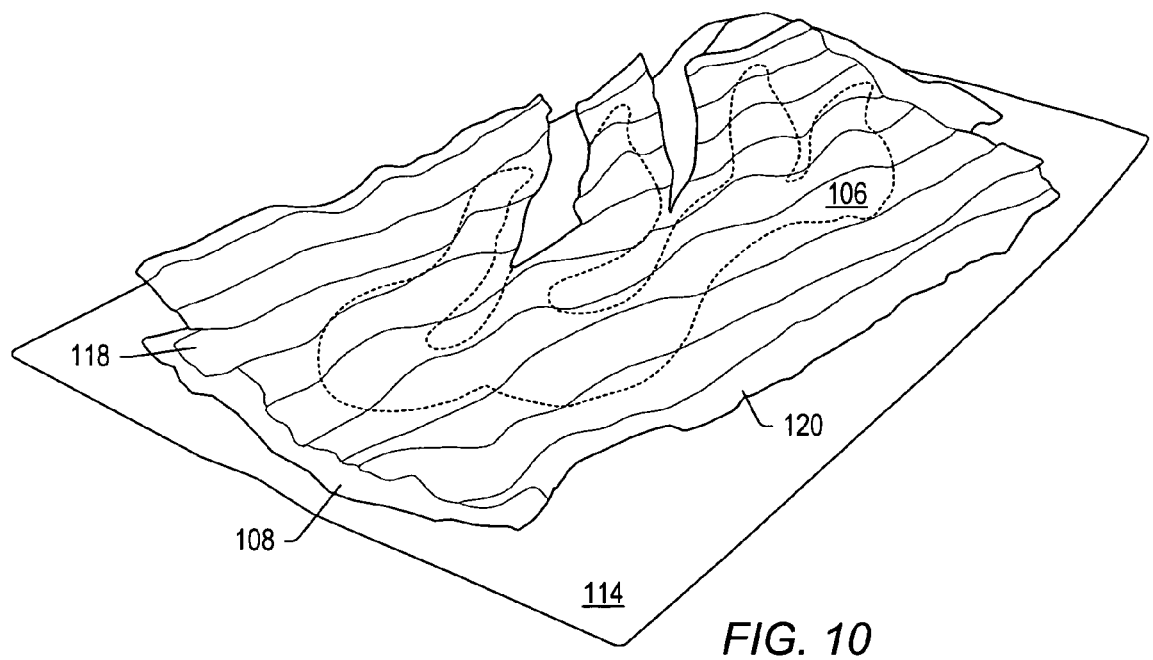
FIG. 10 depicts a perspective view of an embodiment of a peel layer provided to a top surface of a sandwiched article.

After a sandwiched article has been formed, an additional layer (e.g., a "peel" layer) may be placed on top of the sandwiched article. A peel layer may be of any composition such that the curable substance used in forming the sandwiched article does not adhere to the peel layer. In some embodiments, a peel layer may be a woven fabric made of, for example, any of the fibers previously mentioned herein. In some embodiments, a peel layer may be a tightly woven nylon fabric. In certain embodiments, a peel layer may include strips of the same or different material. As depicted in FIG. 10, strips 118 may be applied to a sandwiched article in an overlapping manner such that peel layer 120 covers a top surface of the sandwiched article. Pressure may be applied manually or mechanically to peel layer 120 to conform the peel layer to contours of the sandwiched article.

A sandwiched article may be cured to conform to a portion of vehicle and then removed from the portion of the vehicle. After removal of the cured sandwiched article from the portion of the vehicle, the cured sandwiched article may be connected to the portion of the vehicle or to a similar portion of another vehicle such that the contours of the cured sandwiched article conform to the contours of the vehicle. Thus, sandwiched articles may be manufactured in one location to conform to contours of a particular make and/or model of a vehicle and then shipped to another location to provide custom enhancements of vehicles of the same make and/or model. In some embodiments, a portion of a vehicle (e.g., a gasoline tank for a motorcycle) may be uncoupled from the vehicle, and a sandwiched article may be customized to conform to the portion of the vehicle and then adhered to the portion of the vehicle. After enhancement of the portion of the vehicle with the sandwiched article, the portion of the vehicle may be recoupled to the vehicle.

Figure 11:
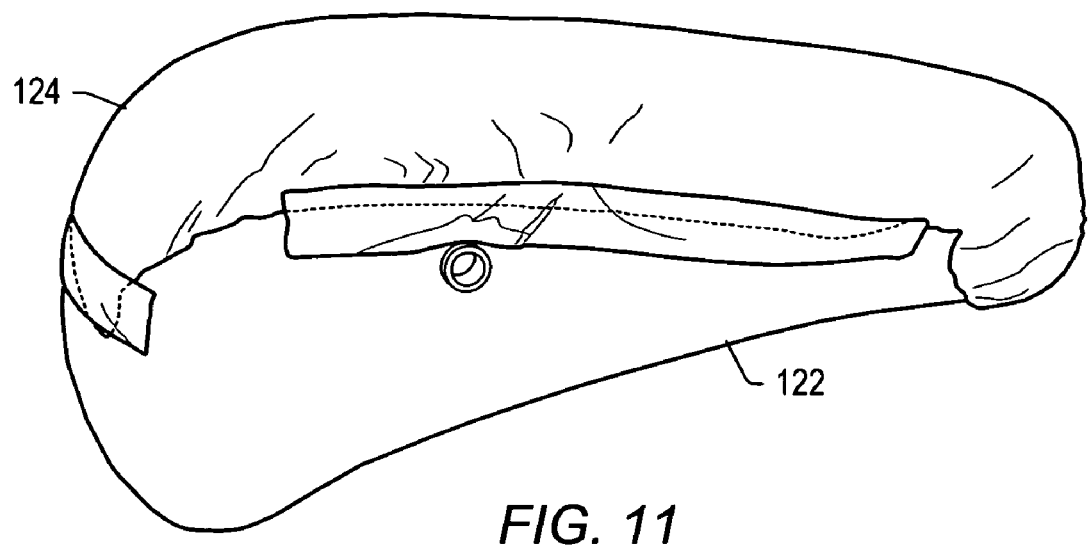
FIG. 11 depicts an embodiment of a portion of a vehicle partially covered with an anti-stick layer.

Before a sandwiched article is cured to conform to a portion of a vehicle, the portion of the vehicle may be prepared to facilitate separation of the sandwiched article from the portion of the vehicle after curing. In some embodiments, preparing the portion of the vehicle may include treating a surface of the portion of the vehicle. In certain embodiments, treating a surface of the portion of the vehicle may include providing an anti-stick coating or layer to the surface of the portion of the vehicle. An anti-stick coating or layer may be removably or irremovably provided to a portion of a vehicle. In some embodiments, an anti-stick coating may be provided to a portion of a vehicle. In certain embodiments, an anti-stick layer may be removably coupled to a portion of a vehicle. For example, metal foil (e.g., gold foil, aluminum foil) may be used as an anti-stick layer. Manual or mechanical pressure may be used to conform the layer of metal foil to a contour of the portion of the vehicle. FIG. 11 depicts a perspective view of an embodiment of vehicle portion 122, shown here as a gasoline tank of a motorcycle, during application of anti-stick layer 124. Anti-stick layer 124 may be advantageously applied smoothly to vehicle portion 122 such that the anti-stick layer is substantially smooth (e.g., without wrinkles).

A sandwiched article may be positioned as desired on at least a prepared portion of a vehicle. The sandwiched article, along with the peel layer, may be conformed to the portion of the vehicle in a desired position. In some embodiments, the surface on which the sandwiched article was formed may be transferred to the portion of the vehicle along with the sandwiched article. In certain embodiments, pressure may be applied manually or mechanically to the sandwiched article to promote contact of and/or reduce a number and/or size of air pockets between the backing layer of the sandwiched article and an anti-stick coating or layer on the portion of the vehicle. In some embodiments, a peel layer may be applied to a sandwiched article after the sandwiched article has been conformed to a portion of a vehicle. After the sandwiched article has been positioned as desired, in some embodiments, the peel layer may be covered with a first permeable layer (e.g., perforated plastic sheeting or perforated plastic bag).

Figure 12:
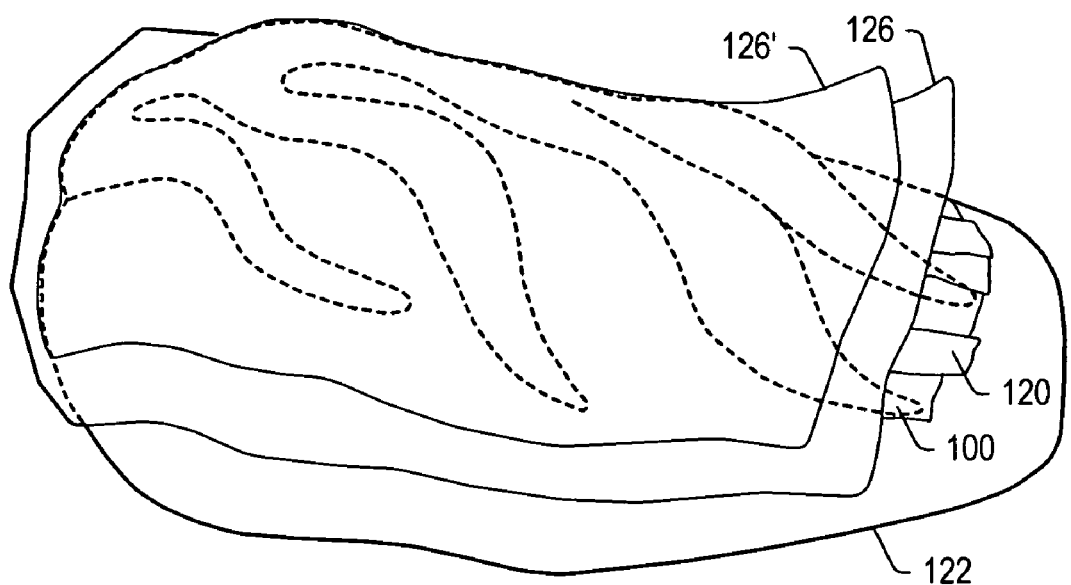
FIG. 12 depicts a perspective view of an embodiment of a sandwiched article with a first permeable layer and a second permeable layer covering a peel layer on top of the sandwiched article.

In some embodiments, a first permeable layer may be covered with one or more additional permeable layers. For example, a first permeable layer may be covered with a second permeable layer. The second permeable layer may be, for example, cotton cloth or lightweight felt. In some embodiments, at least one of the additional permeable layers may help keep the first permeable layer in place. In certain embodiments, the second permeable layer may help absorb liquid (e.g., resin) applied to the sandwiched article. For example, excess resin applied to the sandwiched article may pass through openings in the first permeable layer to the second permeable layer, resulting in a smoother surface following removal of the permeable layers. FIG. 12 depicts a perspective view of an embodiment of sandwiched article 100 positioned on vehicle portion 122, with permeable layers 126, 126' on peel layer 120.

Figure 13:
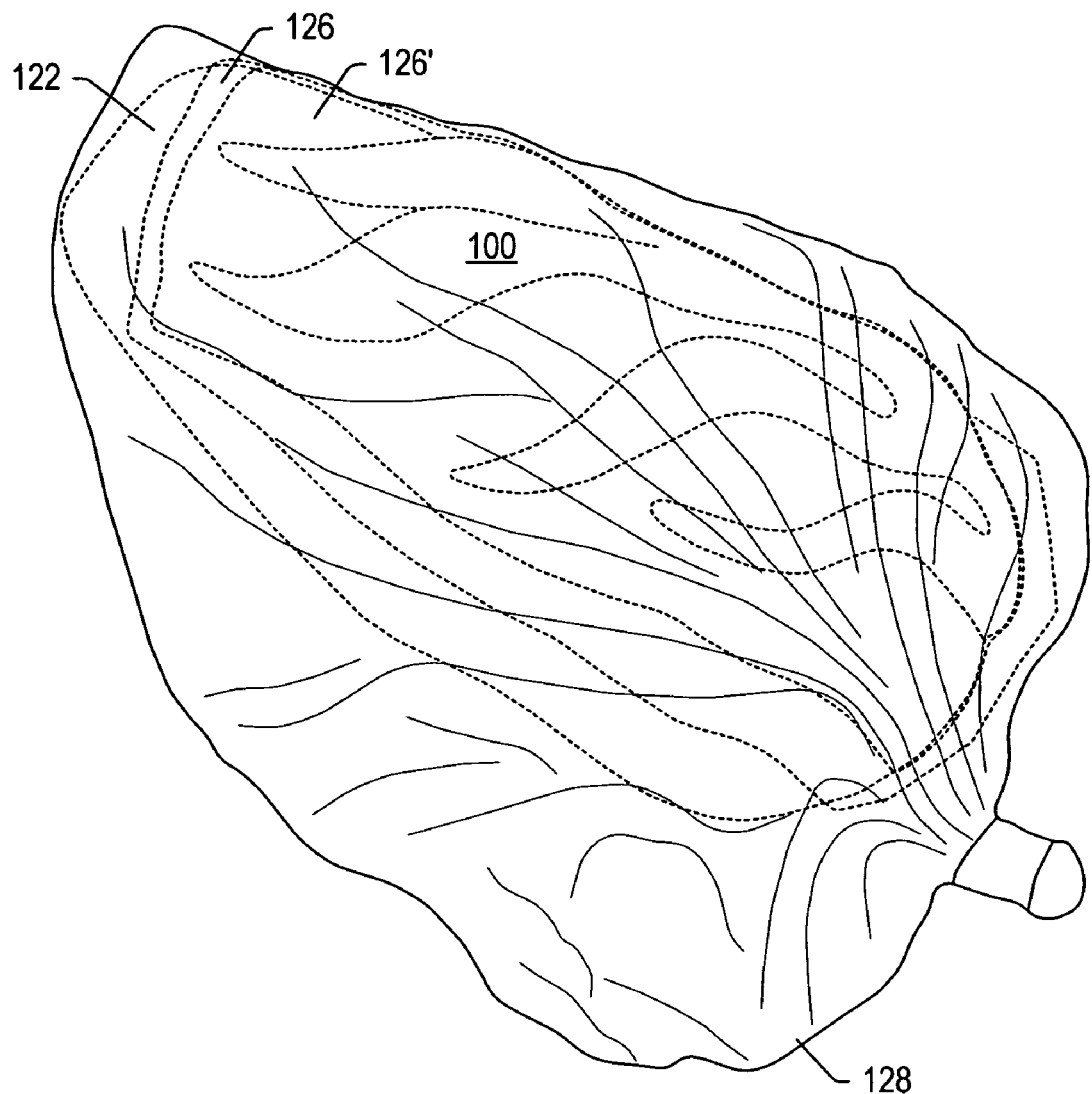
FIG. 13 depicts a perspective view of a sandwiched article positioned on a portion of a vehicle and covered with one or more permeable layers in an airtight compartment.

With one or more permeable layers 126 positioned as desired on peel layer 120, vehicle portion 122 with sandwiched article 100 and backing and top layers may be sealed in a flexible, substantially impermeable enclosure (e.g., a plastic bag or a plastic layer sealed to the vehicle portion). In some embodiments, second permeable layer 126' (or any top permeable layer) may inhibit adhesion of curable substance to the impermeable enclosure. FIG. 13 depicts a perspective view of vehicle portion 122 with sandwiched article 100 covered with permeable layers 126, 126' in enclosure 128.

Enclosure 128 may be subjected to any process generally known in the art (e.g., a vacuum bagging process) to remove air from the enclosure. As air is removed from enclosure 128, permeable layers 126 and sandwiched article 100 may be effectively compressed toward vehicle portion 122. Compressing permeable layers 126 and sandwiched article 100 toward vehicle portion 122 may promote conforming of the sandwiched article to a contour of the object. Compressing permeable layers 126 and sandwiched article 100 toward vehicle portion 122 may compress the top layer(s) to the core and the core to the backing layer(s) to form a more stable, compact sandwiched article. In some embodiments, a vehicle portion with a sandwiched article covered with permeable layers may be placed in a vacuum chamber and the chamber may be evacuated.

Following a process designed to conform sandwiched article 100 to vehicle portion 122 and compress backing and/or top layers toward the core, enclosure 128 and the contents of the airtight compartment may be subjected to a curing process to cure the curable substance in sandwiched article 100. In some embodiments, enclosure 128 and contents of the enclosure may be subjected to heat and/or light suitable to cure curable substance in sandwiched article 100. In certain embodiments, other curing processes known in the art or combinations of such curing processes may be used to cure the one or more curable substances in sandwiched article 100.

Figure 14:
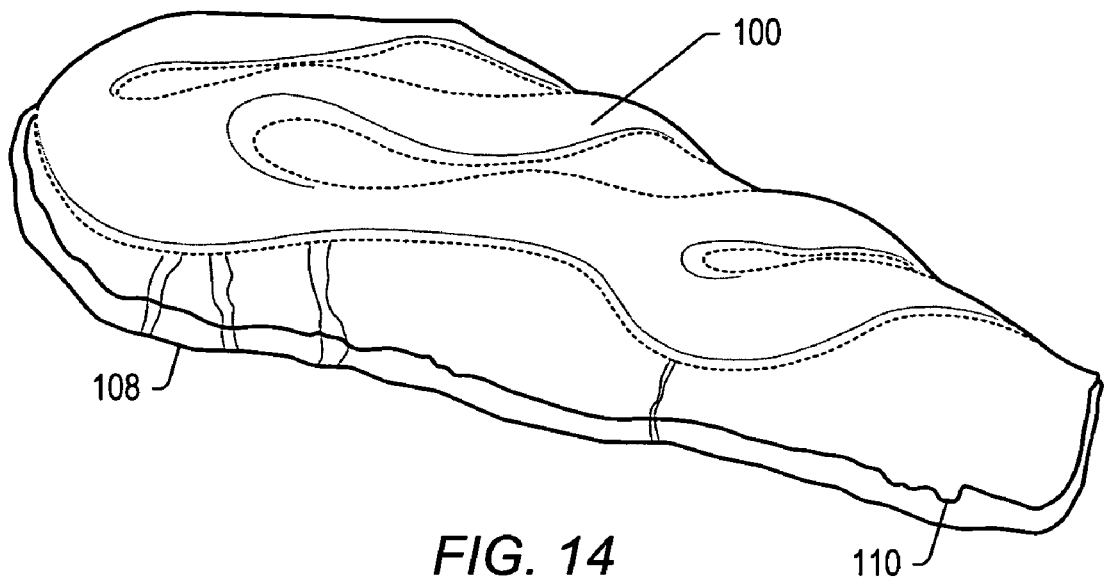
FIG. 14 depicts a perspective view of a cured sandwiched article after removal of the article from the portion of the vehicle depicted in FIG. 13.

After the curable substance in sandwiched article 100 has been cured, enclosure 128 may be opened. Permeable layers 126, 126' (e.g., perforated plastic and felt) may be removed from peel layer 120 or sandwiched article 100. In some embodiments, peel layer 120 may be removed from sandwiched article 100 following removal of permeable layers 126, 126'. The composition and order of permeable layers 126, 126' and the composition and application of peel layer 120 may be chosen to allow removal of the permeable layers and the peel layer without altering the top layer(s) and/or the core of sandwiched article 100. After curing, sandwiched article 100 may be removed from vehicle portion 122. FIG. 14 depicts a perspective view of cured sandwiched article 100 depicted in FIG. 13 (with backing layer 108 and top layer 110) after separation of the sandwiched article from vehicle portion 122.

A large sandwiched article may be more difficult to assemble and/or handle than a small sandwiched article. Curing a large sandwiched article may require larger, more expensive equipment and/or a longer time than curing a small sandwiched article. In some embodiments, two or more cured sandwiched articles may be pieced together on a surface of a vehicle to form a larger cured sandwiched article. For example, portions of a flame may be assembled and cured separately and then connected to a surface of a vehicle and finished to form a substantially continuous enhancement on the surface of the vehicle. Forming a cured sandwiched article from two or more pieces may advantageously allow the cured sandwiched article to be formed more quickly and/or more cost effectively.

Figure 15:
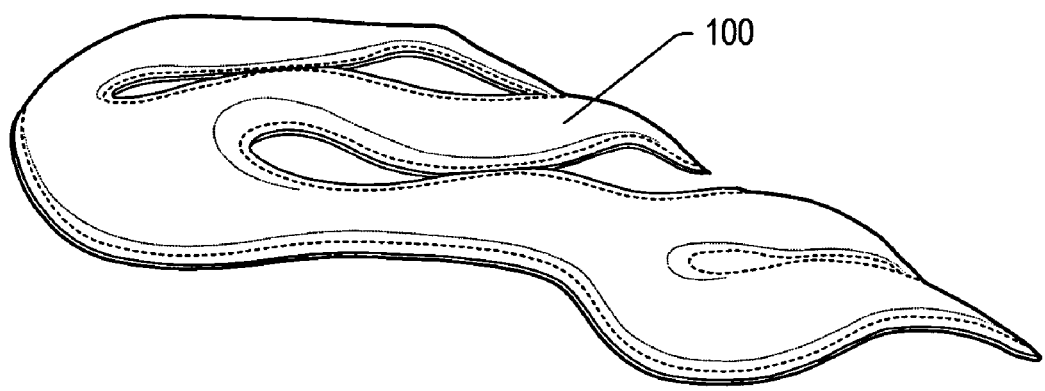
FIG. 15 depicts an embodiment of the cured sandwiched article depicted in FIG. 14 after finishing.

After separation of cured sandwiched article 100 from vehicle portion 122, the sandwiched article may be finished. In some embodiments, finishing may include, but is not limited to, trimming of excess material from layers extending beyond the core, sanding sandwiched article 100 to smooth/remove rough portions, and/or sculpturing at least a portion of the sandwiched article. Edges of sandwiched article 100 may be finished to form a smooth interface between the sandwiched article and the portion of the vehicle to which the sandwiched article is to be connected. In certain embodiments, finishing may include removing loose particulate matter from cured sandwiched article 100. For example, loose particulate matter may be removed from cured sandwiched article 100 by vacuuming. FIG. 15 depicts a perspective view of an embodiment of cured sandwiched article 100 shown in FIG. 14 after finishing of the sandwiched article.

After curing and finishing, sandwiched article 100 may be connected to vehicle portion 122. In some embodiments, sandwiched article 100 may have been conformed to vehicle portion 122 during curing. In certain embodiments, sandwiched article 100 may have been conformed to a portion of another vehicle or a model of a portion of a vehicle during curing. For example, a portion of the vehicle to which sandwiched article 100 is connected may be substantially similar to a portion of the vehicle (or model of the portion of the vehicle) to which the sandwiched article was conformed during curing.

Adhering sandwiched article 100 to vehicle portion 122 may include providing adhesive (e.g., Z-1 putty, available from Joybond Co., Ltd., Tokyo, Japan), putties (e.g., ready-to-use putties) epoxy glues, two-part adhesives, two-part putties, etc. to the backing layer of the sandwiched article and/or to a surface of the portion of the vehicle before positioning the sandwiched article on the portion of the vehicle. Adhesive provided to the backing layer is desirably light, workable, durable, sandable, non-shrinking, non-swelling, and clean (e.g., low dusting, low emission). Applying adhesive to the backing layer of sandwiched article 100 provides a relatively large surface over which adhesion may occur. Application of adhesive to substantially the entire surface area of a backing layer of sandwiched article 100 may allow more secure adhesion of the sandwiched article than application of adhesive to a smaller surface area (e.g., the edges) of the sandwiched article.

Figure 16:
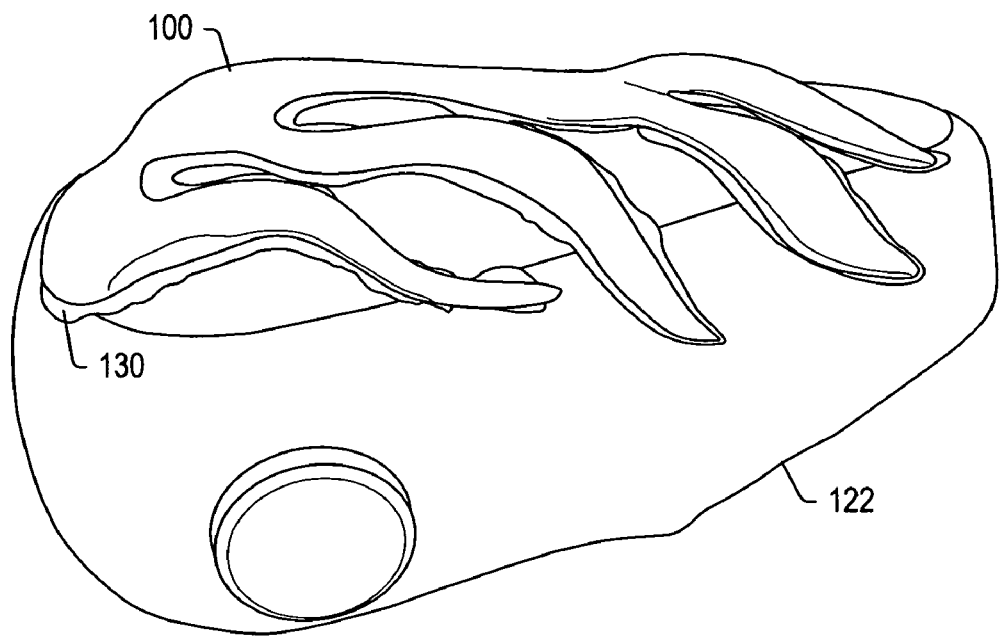
FIG. 16 depicts a perspective view of an embodiment of the cured sandwiched article depicted in FIG. 15 after the cured sandwiched article has been connected to a portion of a vehicle.

In some embodiments, a surface of vehicle portion 122 may be prepared for adhesion of sandwiched article 100. Preparing a surface of vehicle portion 122 for adhesion of sandwiched article 100 may include, but is not limited to, texturing, coating, sanding, and/or combinations thereof. After adhesion of sandwiched article 100 to vehicle portion 122, the adhesive may be cured by any means known in the art (e.g., with light or heat). Curing of the adhesive may adhere the sandwiched article to the object. In some embodiments, an object may be heated, for example, to 120° F. for about 30 minutes. FIG. 16 depicts a perspective view of an embodiment of sandwiched article 100 depicted in FIG. 15 after the sandwiched article has been adhered to vehicle portion 122.

Figure 17:
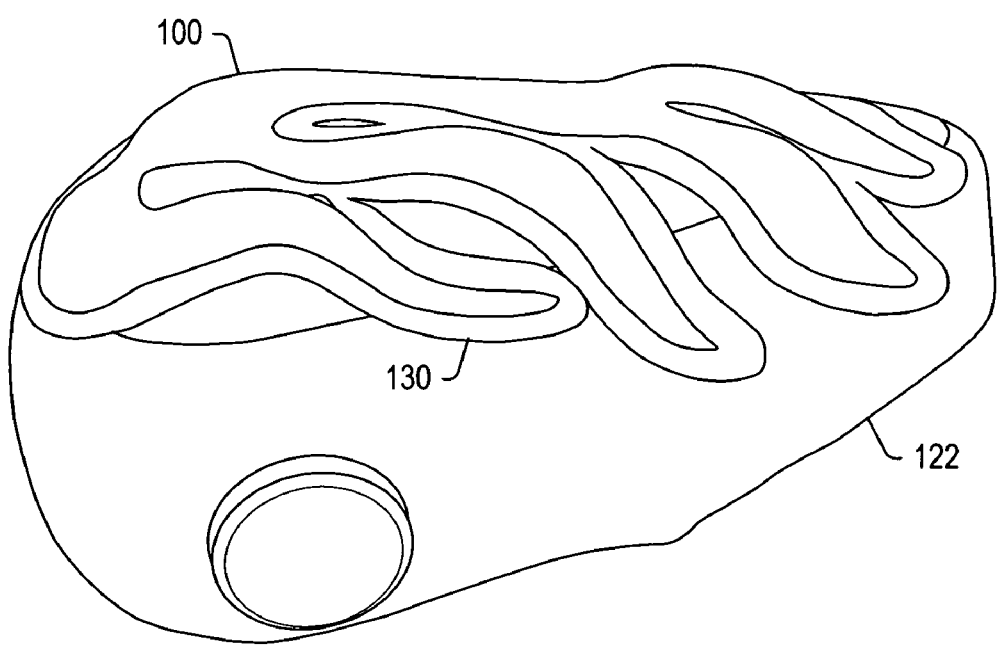
FIG. 17 depicts a perspective view of an embodiment of the cured sandwiched article connected to the portion of the vehicle depicted in FIG. 16, following filling of spaces between the cured sandwiched article and the portion of the vehicle and smoothing of the surface of the cured sandwiched article.

Following curing of the adhesive, curable substance 130 (e.g., putty, such as Z-1putty) may be applied to the interface between the sandwiched article and the portion of the vehicle to fill spaces between the sandwiched article and the portion of the vehicle. FIG. 17 depicts a perspective view of an embodiment of sandwiched article 100 adhered to vehicle portion 122 as depicted in FIG. 16 after smoothing of curable substance 130 around the edges of sandwiched article 100. In some embodiments, curable substance 130 may be applied to at least a portion of a top surface and/or sides of sandwiched article 100 to create a desired contour and/or texture. The curable substance may be cured (e.g., heated), and the cured substance may be finished (e.g., sanded). The curable substance may be a substance that does not change substantially in volume during heating (e.g., a "nonshrink" substance). Finishing of the cured substance (e.g., at the interface between the sandwiched article and the portion of the vehicle) may produce a smooth, seamless appearance of the sandwiched article on the vehicle.

Figure 18:
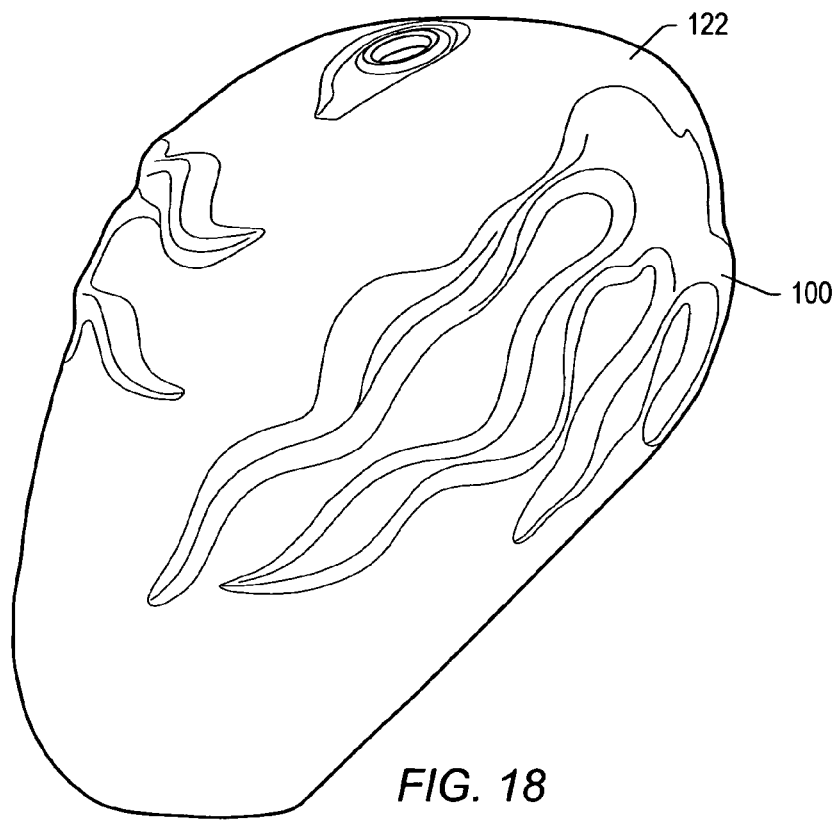
FIG. 18 depicts a perspective view of an embodiment of the cured sandwiched article connected to the portion of the vehicle depicted in FIG. 17, following finishing of the portion of the vehicle and the cured sandwiched article.

The enhanced portion of the vehicle (i.e., the object enhanced with the sandwiched article) may be finished as desired by one or more processes including, but not limited to, priming and painting. FIG. 18 depicts a perspective view of an embodiment of sandwiched article 100 adhered to vehicle portion 122 depicted in FIG. 17, following finishing of the vehicle portion and the sandwiched article.

Figure 19:
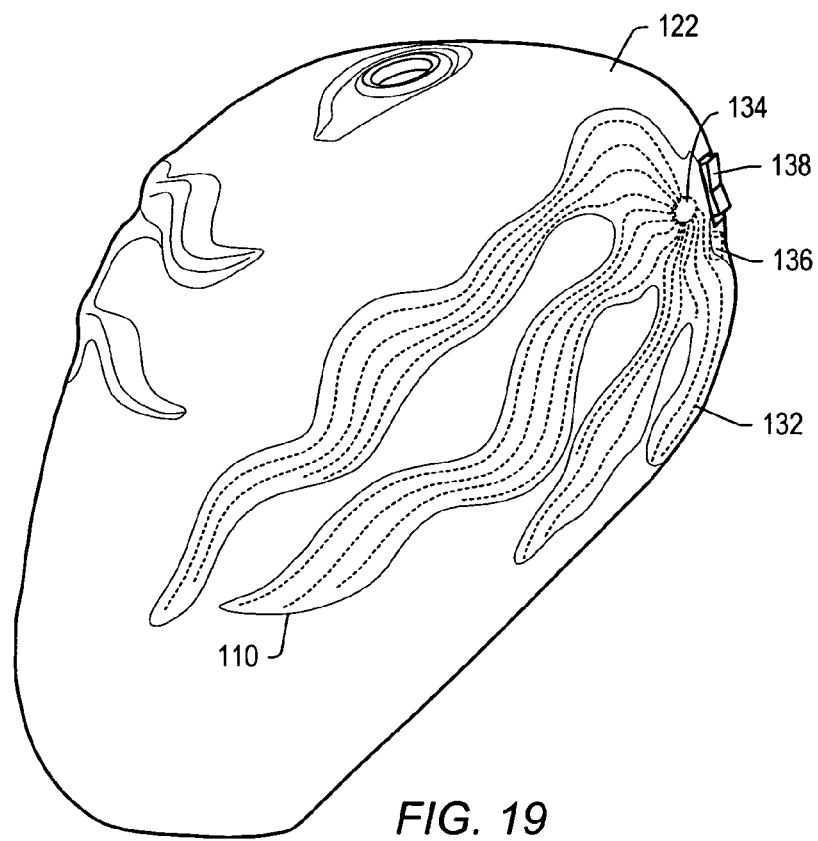
FIG. 19 depicts a perspective view of an embodiment of a cured sandwiched article including fiber-optic fibers.

FIG. 19 depicts a perspective view of the embodiment of sandwiched article 100 shown in FIG. 18 with fiber-optic fibers 132 positioned between top layers 110 of the sandwiched article. Fiber-optic fibers 132 may be made of transparent materials including, but not limited to, glass, plastic, and combinations thereof. Fiber-optic fibers 132 may be positioned singly or in bundles between top layers 110. Light source 134 may be coupled to fiber-optic fibers 132. Power source 136 may be coupled to light source 134. In some embodiments, power source 136 may be a battery. In certain embodiments, light source 134 may be coupled to a power source of the vehicle rather than power source 136. Switch 138 may be positioned between the power source and the light source 134 to allow a user to enable or disable the light source as desired.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of making a cured sandwiched article configured to be connected to a surface of a motorcycle gasoline tank, comprising:
   placing one or more backing layers on a first surface;
   providing a first curable substance to at least one of the backing layers;
   providing a core on at least one of the backing layers;
   providing one or more top layers on the core;
   providing a second curable substance to at least one of the top layers;
   substantially conforming at least one of the backing layers, or at least one of the top layers, to the core to form a sandwiched article;
   positioning the sandwiched article on the surface of the motorcycle gasoline tank;
   providing one or more permeable layers to the sandwiched article;
   applying at least a partial vacuum to the sandwiched article;
   curing at least a portion of the first curable substance and at least a portion of the second curable substance under at least the partial vacuum to at least partially cure the sandwiched article, and wherein at least a portion of the cured sandwiched article is rigid and conformed to a curvature of the motorcycle tank and such curvature is substantially unchanged after curing;
   removing the cured rigid and conformed sandwiched article from the motorcycle gasoline tank; and
   removing the one or more permeable layers from the cured rigid and conformed sandwiched article, wherein the cured rigid and conformed sandwiched article is, during use, adhesively bonded to the surface of the motorcycle gasoline tank.

2. The method of claim 1, wherein the first surface is an anti-stick surface.

3. The method of claim 1, wherein the first curable substance and the second curable substance are substantially the same.

4. The method of claim 1, wherein positioning the sandwiched article on the surface of the portion of the vehicle comprises providing the motorcycle gasoline tank with an anti-stick substance and positioning the sandwiched article on the anti-stick substance.

5. The method of claim 1, wherein curing the sandwiched article comprises curing the sandwiched article such that at least the portion of the cured sandwiched article substantially conforms to the surface of the motorcycle gasoline tank.

6. The method of claim 1, wherein at least the portion of the cured sandwiched article is substantially conformed to the surface of the motorcycle gasoline tank.

7. The method of claim 1, wherein the motorcycle tank is separable from a vehicle.

8. The method of claim 1, wherein applying at least a partial vacuum to the sandwiched article comprises sealing the sandwiched article and at least a part of the motorcycle gasoline tank in a substantially airtight enclosure and evacuating air from the enclosure.

9. The method of claim 1, further comprising providing an additional layer to a top of the sandwiched article, wherein the additional layer comprises non-adhesive material.

10. The method of claim 1, further comprising applying the sandwiched article to the surface of a motorcycle tank.

11. A method of making a cured sandwiched article configured to be connected to a surface of a motorcycle gasoline tank, comprising:
   positioning a sandwiched article on the surface of a motorcycle gasoline tank, the sandwiched article comprising a first curable substance coupled to a backing layer, a core, and a second curable substance, wherein the core is positioned between the first and second curable substances;
   applying at least a partial vacuum to the sandwiched article;
   curing at least a portion of the first curable substance and at least a portion of the second curable substance under at least the partial vacuum to at least partially cure the sandwiched article such that at least a portion of the cured sandwiched article substantially conforms to the surface of the motorcycle gasoline tank, and such curvature is substantially unchanged after curing; and removing the cured rigid and conformed sandwiched article from the motorcycle gasoline tank; and wherein the cured rigid and conformed sandwiched article is, during use, adhesively bonded to the surface of the motorcycle gasoline tank.

12. The method of claim 11, wherein positioning the sandwiched article on the surface of the portion of the vehicle comprises providing the motorcycle gasoline tank with an anti-stick substance and positioning the sandwiched article on the anti-stick substance.

13. The method of claim 11, further comprising providing one or more permeable layers to the sandwiched article prior to applying at least a partial vacuum.

14. The method of claim 11, wherein the cured rigid and conformed sandwiched article has a three-dimensional shape.

15. The method of claim 11, wherein the backing layer comprises a woven material.

16. The method of claim 11, wherein the backing layer comprises fiberglass.

17. The method of claim 11, further comprising positioning one or more top layers between the core and the second curable composition.

18. The method of claim 11, further comprising applying the sandwiched article to the surface of a motorcycle tank.

19. A method of making a cured sandwiched article configured to be connected to a surface of a motorcycle gasoline tank, comprising:

positioning a sandwiched article on the surface of a motorcycle gasoline tank, the sandwiched article comprising a first curable substance coupled to a backing layer, a core, and a second curable substance, wherein the core is positioned between the first and second curable substances;

providing one or more permeable layers to the sandwiched article;

applying at least a partial vacuum to the sandwiched article;

curing at least a portion of the first curable substance and at least a portion of the second curable substance under at least the partial vacuum to at least partially cure the sandwiched article, and wherein at least a portion of the cured sandwiched article is rigid and conformed to a curvature of the motorcycle tank and such curvature is substantially unchanged after curing;

removing the cured rigid and conformed sandwiched article from the motorcycle gasoline tank; and removing the one or more permeable layers from the cured rigid and conformed sandwiched article, wherein the cured rigid and conformed sandwiched article is, during use, adhesively bonded to the surface of the motorcycle gasoline tank.

20. The method of claim 19, wherein positioning sandwiched article on the surface of the portion of the vehicle comprises providing the motorcycle gasoline tank with an anti-stick substance and positioning the sandwiched article on the anti-stick substance.

21. The method of claim 19, wherein applying at least a partial vacuum to the sandwiched article comprises sealing the sandwiched article and at least a part of the motorcycle gasoline tank in a substantially airtight enclosure and evacuating air from the enclosure.

22. The method of claim 19, further comprising applying the sandwiched article to the surface of a motorcycle tank.

* * * * *